Sept. 13, 1927.

E. L. NORTON

WAVE TRANSMISSION SYSTEM

Filed Sept. 23, 1926

1,642,506

Inventor:
Edward L. Norton.
by E.W. Griggs
Attorney.

Patented Sept. 13, 1927.

1,642,506

UNITED STATES PATENT OFFICE.

EDWARD L. NORTON, OF NEW YORK, N. Y., ASSIGNOR TO BELL TELEPHONE LABORATORIES, INCORPORATED, OF NEW YORK, N. Y., A CORPORATION OF NEW YORK.

WAVE-TRANSMISSION SYSTEM.

Application filed September 23, 1926. Serial No. 137,270.

This invention relates to wave transmission systems, and particularly to homogeneous systems for simulating the wave transmission characteristics of composite systems and more particularly to electrical networks for simulating electromechanical systems.

An object of this invention is to simulate the wave transmission properties of a composite system, such as an electromechanical system, by means of a homogeneous system, such as an electrical or a mechanical system.

Other objects of this invention are to balance the impedance of a composite electromechanical system by means of an electrical network and to embody a composite electromechanical system in an electrical network requiring a definite relation between the impedance of its parts.

For many purposes, it is desirable to construct a homogeneous system which will simulate the wave transmission characteristics of a composite system, particularly an electrical network which will possess the same wave transmission properties as a composite electromechanical system. For example, it may be desirable, in order to determine by electrical tests the reactions in a composite electromechanical system which may be expected under various operating conditions, to use a composite system for balancing the impedance of a composite system, or to electrically simulate a composite system in order to combine it in an electrical system such as one employing constant resistance networks.

Heretofore, it has not been possible to simulate the wave transmission characteristics of a composite electromechanical system by means of either an electrical system or a mechanical system because of the nature of the phenomenon of conversion of electrical waves into mechanical waves or vice versa. The nature of this conversion is more fully discussed in the detailed description below where reference is made to the equations relating the electrical current to the mechanical velocity in a composite system.

In the description of this invention it should be borne in mind that the characteristics of wave motion in electrical and mechanical systems are analogous, so that the same equations of motion apply to both systems except for the symbols employed. The corresponding quantities in the two systems together with the symbols are:

| Mechanical. | Electrical. |
|---|---|
| Force $= F$ (dynes) | Voltage $= E$ (volts) |
| Velocity $= V$ (cm./sec.) | Current $= I$ (amperes) |
| Displacement $= s$ (cm.) | Charge $= q$ (coulombs) |
| Impedance $= Z$ (dyne sec./cm.) | Impedance $= Z$ (ohms) |
| Resistance $= r$ (dyne sec./cm.) | Resistance $= R$ (ohms) |
| Reactance $= x$ (dyne sec./cm.) | Reactance $= X$ (ohms) |
| Mass $= m$ (gms.) | Inductance $= L$ (henries) |
| Compliance $= c$ (cm. dyne) | Capacity $= C$ (farads) |

Thus, in a homogeneous system for simulating a composite system we would expect mechanical forces to be represented by electrical voltages, mechanical velocities by electrical currents, mass elements by inductance elements, compliance elements by capacity elements, etc. Such an ordinary type of simulation appears to be impossible of achievement because of the nature of the equations relating the electrical current to the mechanical velocity.

Nevertheless, in accordance with a feature of this invention, it has been found possible to obtain a peculiar type of simulation in which the wave transmission characteristics in one portion of a homogeneous system are inversely related to wave transmission characteristics of one side of the composite system in a similar manner to the wave transmission characteristics of inverse electrical networks, as fully discussed by O. J. Zobel and K. S. Johnson in the publications referred to in the detailed description which follows. In inverse networks each element or group of elements of one network is related in arrangement and composition to that of another in such a way that it represents an admittance for the impedance of the other. Thus in one network of a pair of inverse networks, a voltage resulting from a constant current excitation corresponds to a current of the other resulting from a constant voltage excitation.

This peculiar type of simulation, in which mechanical forces and velocities appear, respectively, as electrical currents and electromotive forces or vice versa, is obtained by the use of a homogeneous system having one portion composed of impedance elements equivalent to one side of the composite system and another portion composed of impedance elements arranged in inverse form to the elements of the other side of the system and having coefficients related thereto by the square of the coupling factor. An electrical system of this type consists of one network equivalent to the electrical portion of the composite system and a second network which is of inverse form to the analogue of the mechanical portion of the system.

In one embodiment of this invention an electrical network of the type described above is employed for accurately balancing the impedance of a composite electromechanical system.

Another embodiment of this invention consists of a constant resistance network comprising an electromechanical system in one arm, and a complementary electrical network designed in accordance with the above feature of the invention in another arm.

This invention can be more readily understood by reference to the following detailed description in connection with the drawings in which.

Figure 1:
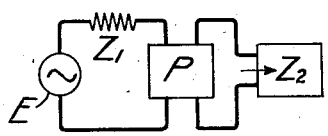
Fig. 1 shows diagrammatically the electrical analogue of a general composite electromechanical system.

Since it is now the practice to apply electrical theory and the equations for electrical wave transmission to the design of mechanical systems it is customary to represent the latter by their electrical analogues. Fig. 1 shows such an analogue of a composite electromechanical system in which E represents a source of electromotive force, $Z_1$ represents the total impedance of the electrical system, P represents the coupling impedance between the electrical and mechanical systems, and $Z_2$ represents the total impedance of the mechanical portion of the system.

The current $I_1$ in the electrical system and the velocity $V_2$ in the mechanical system are related by the following equations, a derivation of which, from the general Lagrangian equations of motion, is given by R. L. Wegel in "Theory of magneto-mechanical systems as applied to telephone receivers and similar structures", Journal of the American Institute of Electrical Engineers, Vol. XL, No. 10, October 1921:

$$E = I_1 Z_1 + V_2 P \quad (1)$$
$$o = -I_1 P + V_2 Z_2 \quad (2)$$

where P, which is a constant, is the electromagnetic coupling impedance between the two systems; that is, the force factor relating the mechanical force produced to the current which produces it.

If the factor P had the same sign in both equations, it would be like an electrical mutual impedance and the composite system could be represented by a pair of transformer coupled networks in which mechanical velocities would appear as electrical currents and mechanical forces as electromotive forces. However, since the factor P has a different sign in each equation, such an equivalence appears impossible of achievement. Nevertheless, in accordance with a feature of this invention it has been found possible to obtain an interesting and highly useful type of equivalence in which the mechanical velocities, instead of appearing as currents, appear as electromotive forces and mechanical forces appear as currents.

This type of equivalence is obtained by connecting in series with a network representing the electrical network, a second electrical network which is of the inverse form to the mechanical portion of the system and the coefficients of the elements of which are related to the coefficients of the mechanical elements by the factor $P^2$. Such a network is the inverse of the electrical analogue of the mechanical system, the two being analogous to inverse electrical networks, such as are described in the copending application of O. J. Zobel, Serial No. 580,769, filed August 9, 1922 and in chapter XVIII of Transmission Circuits for Telephonic Communication by K. S. Johnson, Van Nostrand and Company, New York.

As defined in these references, an inverse network is one so related to another network in arrangement and composition that it represents an admittance for the impedance of each element and group of elements of the other network, the ratio of the admittance to the impedance in each case (or the product of the two impedances) being a constant. In the inverse network, series connections in the analogue of the mechanical system are replaced by parallel connections and vice versa, mechanical masses are replaced by capacities, and mechanical compliances are replaced by inductances.

The proof that a homogeneous system so constructed is the equivalent of the composite system in wave transmission properties (inverse transformation between velocity and electromotive force and between force and current being, of course, a limitation) is as follows:

Solving equation (2) for $V_2$ we get, $$V_2 = I_1 \frac{P}{Z_2} \quad (3)$$

Substituting this value for $V_2$ in equation (1) and transposing we get:

$$I_1 = \frac{E}{Z_1 + \frac{P^2}{Z_2}} \quad (4)$$

It is evident from equation (4) that the effect of the coupled mechanical system upon the electrical circuit is to add an impedance;

$$Z_M = \frac{P^2}{Z_2} \quad (5)$$

and hence the impedance of the composite system may be exactly simulated by replacing the coupled mechanical elements by a series connected impedance having the value $Z_M$.

From the equation (5) it follows that, $$Z_M Z_2 = P^2 \quad (6)$$

Since this expression defined a pair of inverse networks, the network constituting $Z_M$ is a network of inverse form to the network constituting the impedance $Z_2$ and may be designed from a knowledge of the composition of that mechanical network by the rules governing the construction of inverse networks, given above.

It follows directly from equation (4) that the voltage $E_M$ across the impedance $Z_M$ is equal to:

$$E_M = I_1 Z_M = I_1 \frac{P^2}{Z_2} \quad (7)$$

and therefore, substituting from equation (3), $$E_M = P V_2 \quad (8)$$

also from equation (3), $$I_1 = \frac{V_2 Z_2}{P} \text{ or,} \quad (9)$$

$$I_1 = \frac{F}{P} \quad (10)$$

where F is the force in the mechanical system. These equations (8) and (10), show that the voltages and currents in the electrical analogue correspond respectively to the velocity and force of the mechanical system, the force factor P appearing the same way the impedance ratio of a transformer appears in the equations for coupled circuits.

In the foregoing analysis only impedance has been taken into account. If the mechanical portion of the composite system is an extended network, such as a mechanical filter, with some kind of a load connected to its output terminals it is also necessary that the propagation constant of the inverse network, $Z_M$, should be equal to the propagation constant of the mechanical portion. In such a system $Z_2$ would be the input impedance of the mechanical portion.

The propagation and image transfer constants of the mechanical network are determined from the open circuit and short circuit impedances measured at the input terminals.

$$\tanh \Theta_2 = \sqrt{\frac{Z_{2S}}{Z_{2O}}} \quad (11)$$

in which $\Theta_2$ is the transfer constant and $Z_{2S}$ and $Z_{2O}$ are, respectively, the short circuit and open circuit impedances of the mechanical system.

Similarly, $$\tanh \Theta_M = \sqrt{\frac{Z_{MS}}{Z_{MO}}} \quad (12)$$

in which $\Theta_M$, $Z_{MS}$ and $Z_{MO}$ are respectively the transfer constant, the short circuit impedance and the open circuit impedance of the network $Z_M$.

The short circuit impedance of a network is proportional to the open circuit impedance of its inverse network and vice versa, as may be seen by reference to page 90 of Transmission Circuits for Telephonic Communication, to which reference was made above. Thus:

$$Z_{MS} = \frac{P^2}{Z_{2O}} \quad (13)$$

and $$Z_{MO} = \frac{P^2}{Z_{2S}} \quad (14)$$

Substituting the values from equations (13) and (14) in equation (12) we get, $$\tanh \Theta_M = \sqrt{\frac{\frac{P^2}{Z_{2O}}}{\frac{P^2}{Z_{2S}}}} = \sqrt{\frac{Z_{2S}}{Z_{2O}}}$$

From which, by equation (11), $$\tanh \Theta_M = \tanh \Theta_2 \quad$$

Therefore since the transfer constants of the networks $Z_2$ and $Z_M$ are equal, and since the input voltage of the network $Z_M$ corresponds to the input velocity of the mechanical network $Z_2$ there will be a similar relation between the voltages and velocities at all corresponding points in the two systems.

Figure 2:
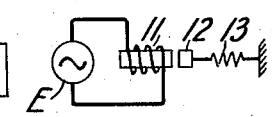
Fig. 2 shows diagrammatically a specific composite system.
Figure 3:
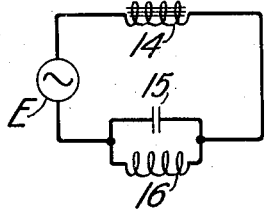
Fig. 3 shows an electrical system having transmission properties equivalent to those of the composite system of Fig. 2, in accordance with the features of this invention.

Now referring to the specific composite system shown diagrammatically in Fig. 2, in which a source of electromotive force E is shown connected to the winding 11 of an electromagnetic device comprising an armature 12 retained by a spring 13, the armature and spring are in effect a mass $m_{12}$ and a compliance $c_{13}$ in series. In the inverse networks of the equivalent homogeneous system, the series connection becomes a parallel connection, the mass becomes a capacity and the compliance becomes an inductance. The electrical equivalent of the composite system of Fig. 2 is therefore shown in Fig. 3 in which the inductance 14 represents the winding 11 and is equivalent to the impedance of the electrical portion of the system, the capacity 15 has a value $\frac{M_2}{P^2}$, and the inductance 16 has a value $P^2 c_{13}$, the latter two in parallel being equivalent to the mechanical portion of this system.

This may be shown in a different manner, thus:

As stated above, the mechanical portion of the system of Fig. 2 is equivalent to a mass, $m_{12}$, and a compliance $c_{13}$ in series so that, $$Z_2 = j\omega m_{12} + \frac{1}{j\omega c_{13}}$$

Substituting this value in equation (5), $$Z_M = \frac{P^2}{j\omega m_{12} + \frac{1}{j\omega c_{13}}}$$

Rationalizing and multiplying by $\frac{P^2}{P^2}$, $$Z_M = \frac{\left(\frac{P^2}{j\omega m_{12}}\right)(j\omega c_{13} P^2)}{j\omega c_{13} P^2 + \frac{P^2}{j\omega m_{12}}}$$

This corresponds to a parallel circuit comprising an inductance of value $P^2 C_{13}$ and a condenser of capacity $\frac{m_2}{P^2}$.

Figure 4:
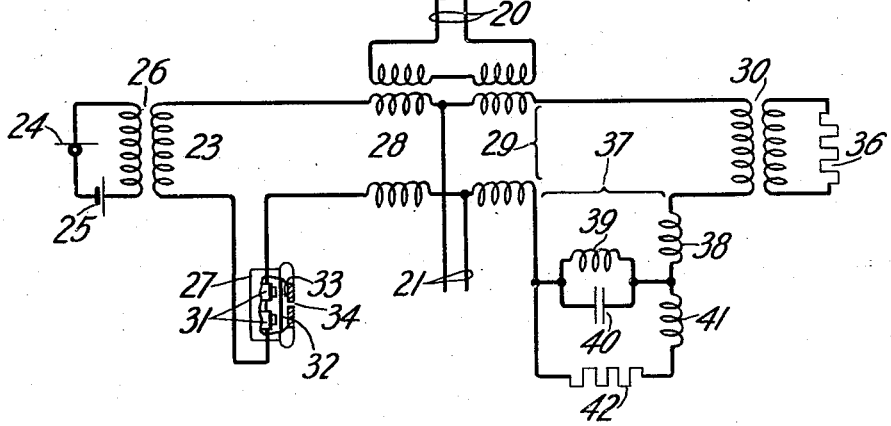
Fig. 4 shows an embodiment of this invention in a system for balancing the impedance of an electromagnetic system.
Figure 6:
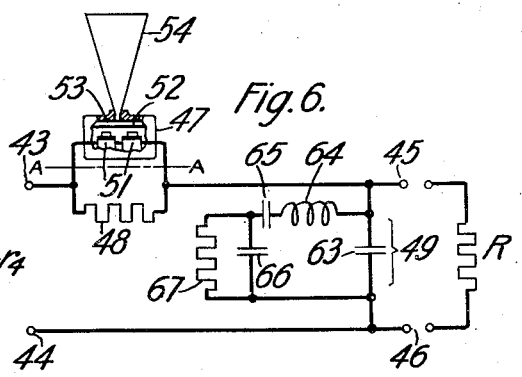
Fig. 6 shows an embodiment of this invention in which an electromagnetic system is combined in an electrical circuit employing inverse networks.

Figs. 4 and 6 illustrate useful applications of this invention.

Fig. 4 shows a system employing the equivalent network of this invention for balancing the impedance of an electromagnetic receiver. This system comprises two signaling lines 20 and 21 between which it is desired to prevent interaction while permitting two-way communication between each and an operator's set 23. Such an arrangement for example, might be advantageous for use as a monitoring circuit for telephone lines equipped with repeaters. The telephone set 23 comprises a transmitter 24 connected in series with a battery 25 to the primary of a transformer 26 the secondary of which is connected in series with the windings of an electromagnetic receiver 27. The balanced operating arrangement is obtained by use of a hybrid coil 28 and a network 29 for balancing the impedance of the telephone set. The network 29 comprises a series connection of a transformer 30, having a resistance 36 connected to its secondary winding for balancing the impedance of the transformer 26 and the transmitter 24, and a network 37, for balancing the impedance of the receiver 27. As explained in detail in the following paragraph, the network 37 is constructed in accordance with the principles of this invention set forth above. This set operates so that waves from either of the lines 20 or 21 divide between the set 23 and the network 29 but are not transmitted to the other line, while signaling waves generated by the transmitter 24 are effective in both of the lines 20 and 21.

Figure 5:
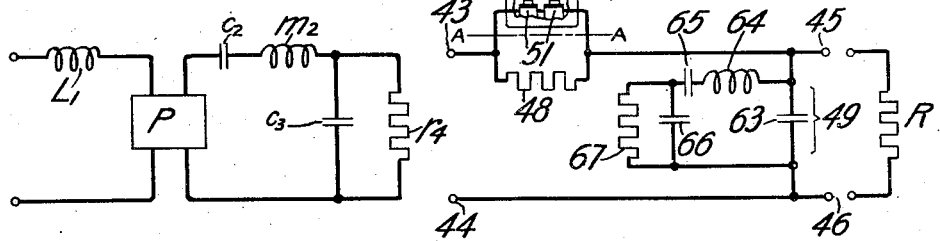
Fig. 5 shows the electrical analogue of the electromagnetic system of Fig. 4.

Fig. 5 shows the electrical analogue of the receiver 27 in which $L_1$ represents the inductance of the windings 31. P represents the coupling impedance between the electrical and mechanical portions of the system, $m_2$ and $c_2$ represent, respectively, the mass and compliance of the diaphragm 32, $c_3$ represents the compliance of the air chamber 33, and $r_4$ represents the resistance of the aperture 34. The network 37, which is constructed in accordance with the principles of this invention for simulating the impedance characteristics of the receiver 27, comprises an inductance 38 having a value $L_1$ for simulating the impedance of the windings 31 connected in series with an inverse network for simulating the mechanical portion of the receiver. The inverse network comprises a shunt inductance 39 of a value $c_2 P^2$, a shunt capacity 40 of a value $\frac{m_2}{P^2}$, a series inductance 41 of a value $c_3 P^2$ and a terminating resistance 42 of a value $\frac{P^2}{r_4}$.

Fig. 6 shows a constant resistance network embodying an electromagnetic device and a network according to this invention. Supposing, for example, it is desired to introduce a receiver between the two sets of terminals 43, 44 and 45, 46, the latter of which are connected to a circuit having a constant resistance impedance R, without adding variable impedance to the circuit. As set forth in the application of O. J. Zobel, referred to above this can be done by the use of inverse networks. Thus, if the receiver is inserted in a series arm the impedance at the terminals 43, 44 can be maintained a constant resistance by inserting the inverse network of the receiver in a shunt arm. Use is made of the method of the present invention for obtaining a homogeneous system equivalent to a composite system in order to construct the inverse network of the receiver. Thus a loud speaking receiver 47 shunted by a resistance element 48 of value R is connected in a series arm, while there is connected in a shunt arm a network 49 having an impedance $Z_9$ which is related to the impedance $Z_7$ of the receiver 47 by the expression $Z_7 Z_9 = R^2$.

Figure 7:
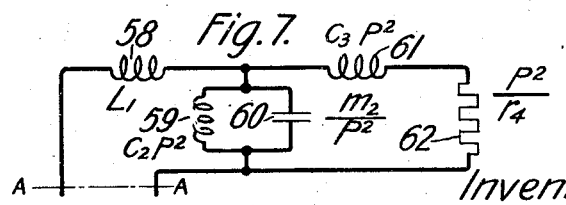
Fig. 7 shows a simple electrical network equivalent to the composite electromechanical system of Fig. 6.

The network 49 is designed as follows: The electrical analogue of the loud speaking receiver 47 is identical in arrangement of elements to the analogue shown in Fig. 5 of the receiver 27 of Fig. 4. For receiver 47, $L_1$ represents the inductance of the windings 51, P represents the coupling impedance between the electrical and mechanical portions, $c_2$ and $m_2$ represent, respectively, the compliance and mass of the diaphragm 52, $c_3$ represents the compliance of the air chamber 53, and $r_4$ represents the resistance of the horn 54. The receiver can therefore be represented by the electrical network of Fig. 7 in which inductance element 58 has a value $L_1$; inductance element 59, a value $c_2 P^2$; condenser 60, a value $\frac{m_2}{P^2}$; inductance element 61, a value $c_3 P^2$; and resistance 62, a value $\frac{P^2}{r_4}$. The network 49 must therefore be constructed to be the inverse form of this network, the condenser 63 having a value $\frac{L_1}{R^2}$; inductance element 64, $\frac{m_2 R^2}{P^2}$; condenser 65, $\frac{c_2 P^2}{R^2}$; condenser 66, $\frac{c_3 P^2}{R^2}$ and resistance 67, $\frac{r_4 R^2}{P^2}$.

It should be noted that, since in the network 49 the inverse transformation is twice made, the impedance elements related to the mechanical portion of the composite system appear in the same arrangement as they do in the electrical analogue although they differ in value by the ratio $\frac{R^2}{P^2}$ or $\frac{P^2}{R^2}$ for the masses (inductances) and resistances or the compliances (capacities), respectively.

What is claimed is:

1. A homogeneous wave transmission system for simulating the wave transmission characteristics of a composite wave transmission system having an electrical portion and mechanical portion, said homogeneous system comprising one part having an impedance equal to the impedance of one portion of the composite system and a second part having an impedance inversely proportional to the impedance of the other portion of the composite system.

2. A homogeneous wave transmission system for simulating the wave transmission characteristics of a composite system having an electrical portion and a mechanical portion so coupled as to transmit wave energy from one to the other, said homogeneous system comprising one part having an impedance corresponding to the impedance of one of said portions of the composite system and another part effectively in series therewith and comprising impedance elements of inverse form and arrangement to the elements of the analogue of the other of said portions of the composite system, the coefficients of the impedance elements of said other part being related to the coefficients of the elements of said analogue by the square of the coupling factor of the composite system.

3. A homogeneous system for simulating the wave transmission properties of a composite system having a mechanical portion and an electrical portion, said simulation being of such a type that mechanical velocities appear as electromotive forces and mechanical forces as electrical currents and vice versa, said homogeneous system comprising one part composed of impedance elements corresponding to the impedance elements of one portion of the composite system and another part composed of impedance elements of inverse form and arrangement to the analogue of the other portion of the composite system, the impedance $Z_M$ of said last mentioned part being related to the impedance $Z$ of said other portion of the composite system by the equation;

$$ZZ_M = P^2$$

in which P is the coupling factor between the electrical and mechanical portions of the composite system.

4. An electrical network for simulating the wave transmission characteristics of a composite electromechanical system having an electrical portion and a mechanical portion, said simulation being of such a type that mechanical velocities appear as electromotive forces and mechanical forces as electrical currents, said electrical network comprising two branches one of which is composed of impedance elements equivalent to the impedance elements of the electrical portion of the composite system and the other of which is composed of impedance elements of inverse form and arrangement to the impedance elements of the analogue of the mechanical portion of the composite system.

5. An electrical network for simulating the wave transmission characteristics of a composite electromechanical system having an electrical portion of impedance $Z$ and a mechanical portion of impedance $Z_2$, where $Z_1$ and $Z_2$ are any functions of frequency, said network comprising two series connected branches one of which has an impedance equal to $Z_1$ and the other of which has an impedance equal to $\frac{P^2}{Z_2}$, where P is the coupling factor between the electrical and mechanical portions of the composite system.

6. In combination, a composite electromechanical system comprising an electrical portion and a mechanical portion, and a homogeneous system having an impedance proportional to the impedance of said composite system, said homogeneous system comprising one portion having impedance elements of similar form and arranged in a manner similar to the impedance elements of one of said portions of the composite system, and a second portion having impedance elements of inverse form and arrangement to the impedance elements of the other of said portions of the composite system.

7. In combination, a composite electromechanical system, comprising an electrical portion and a mechanical portion and an electrical network having an impedance proportional to the impedance of said composite system, said network comprising one branch composed of impedance elements of a similar form and arranged in a manner similar to the impedance elements of one of said portions of the composite system, and a second network connected in series therewith and composed of impedance elements of inverse form and arrangement to the impedance elements of the other of said portions of the composite system.

8. In combination, a composite electromechanical system, comprising an electrical portion of impedance $Z_1$ and a mechanical portion of impedance $Z_2$, where $Z_1$ and $Z_2$ are any functions of frequency, and an electrical network for balancing the impedance of said composite system, said network comprising a circuit branch of impedance $Z_1$, and a second circuit branch impedance $\frac{P^2}{Z_2}$ connected in series therewith, where P is the coupling factor between the electrical and mechanical portions of said composite system.

In witness whereof, I hereunto subscribe my name this 21st day of September, A. D. 1926.

EDWARD L. NORTON.